(12) United States Patent
Kim et al.

(10) Patent No.: US 12,254,905 B2
(45) Date of Patent: Mar. 18, 2025

(54) IMAGE OUTPUT METHOD AND ELECTRONIC DEVICE SUPPORTING SAME

(71) Applicant: SAMSUNG ELECTRONICS CO., LTD., Suwon-si (KR)

(72) Inventors: Wonki Kim, Suwon-si (KR); Keunha Choi, Suwon-si (KR); Jin Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 59 days.

(21) Appl. No.: 18/103,080

(22) Filed: Jan. 30, 2023

(65) Prior Publication Data

US 2023/0178116 A1 Jun. 8, 2023

Related U.S. Application Data

(63) Continuation of application No. PCT/KR2021/009822, filed on Jul. 28, 2021.

(30) Foreign Application Priority Data

Jul. 31, 2020 (KR) .................. 10-2020-0096312

(51) Int. Cl.
  *G11B 27/10* (2006.01)
  *G11B 27/34* (2006.01)
(52) U.S. Cl.
  CPC ............ *G11B 27/102* (2013.01); *G11B 27/34* (2013.01)

(58) Field of Classification Search
  CPC .................. G11B 27/102; G11B 27/34; H04N 21/41407; H04N 21/43076;
  (Continued)

(56) References Cited

U.S. PATENT DOCUMENTS

| 7,492,414 B2 | 2/2009 | Amendolagine et al. |
| 7,941,030 B2 | 5/2011 | Fuchigami et al. |

(Continued)

FOREIGN PATENT DOCUMENTS

| JP | 2005-242631 A | 9/2005 |
| JP | 2009-182473 A | 8/2009 |

(Continued)

OTHER PUBLICATIONS

Search Report (PCT/ISA/220, 210) issued Nov. 11, 2021 by the International Searching Authority for International Patent Application No. PCT/KR2021/009822.

(Continued)

*Primary Examiner* — Thai Q Tran
*Assistant Examiner* — Stephen R Smith
(74) *Attorney, Agent, or Firm* — Sughrue Mion, PLLC

(57) ABSTRACT

An electronic device includes: a display; and a processor configured to: play a video on the display by using a first application, obtain playback information associated with playing the video by using the first application, activate a second application while the video is played by using the first application, determine a frame of the video corresponding to a time point at which the second application is activated, and seek the frame to play the video by using the second application, based on the second application being able to seek the frame within a reference time.

18 Claims, 8 Drawing Sheets

(58) Field of Classification Search
CPC ....... H04N 21/43078; H04N 21/43615; H04N 21/443; H04N 21/4333; H04N 21/43637
USPC .............................. 386/230, 248; 725/25, 90
See application file for complete search history.

(56) References Cited

U.S. PATENT DOCUMENTS

| | | | |
|---|---|---|---|
| 8,212,928 | B2 | 7/2012 | Amendolagine et al. |
| 9,066,059 | B2 | 1/2015 | Amendolagine et al. |
| 9,277,260 | B2 | 3/2016 | Johansson et al. |
| 9,681,086 | B2 | 6/2017 | Greene et al. |
| 10,191,613 | B2 | 1/2019 | Kwon et al. |
| 10,469,791 | B2 | 11/2019 | Greene et al. |
| 10,674,226 | B2 | 6/2020 | Moore |
| 10,965,972 | B2 | 3/2021 | Choi et al. |
| 2006/0140575 | A1 | 6/2006 | Fuchigami et al. |
| 2007/0157268 | A1* | 7/2007 | Girish ................ G11B 27/005 386/E5.052 |
| 2012/0084803 | A1 | 4/2012 | Johansson et al. |
| 2014/0192265 | A1 | 7/2014 | Amendolagine et al. |
| 2015/0264292 | A1* | 9/2015 | Greene ................ G06F 3/0488 386/248 |
| 2015/0296259 | A1 | 10/2015 | Son et al. |
| 2016/0253072 | A1 | 9/2016 | Kwon et al. |
| 2017/0280095 | A1 | 9/2017 | Greene et al. |
| 2018/0091867 | A1 | 3/2018 | Moore |
| 2018/0107353 | A1 | 4/2018 | Lee |
| 2019/0272088 | A1* | 9/2019 | Liu .................... H04N 21/2393 |
| 2020/0053399 | A1 | 2/2020 | Choi et al. |
| 2020/0068165 | A1 | 2/2020 | Greene et al. |
| 2020/0186859 | A1* | 6/2020 | Gazzini ............ H04N 21/43076 |
| 2020/0310627 | A1* | 10/2020 | Ning ........................ G06F 9/451 |
| 2021/0192223 | A1* | 6/2021 | Williams ............... G11B 27/34 |

FOREIGN PATENT DOCUMENTS

| | | | |
|---|---|---|---|
| JP | 2012-142754 A | 7/2012 | |
| JP | 2018-107596 A | 7/2018 | |
| JP | 6711120 B2 | 6/2020 | |
| KR | 10-2005-0052928 A | 6/2005 | |
| KR | 10-2007-0010788 A | 1/2007 | |
| KR | 2007010788 A * | 1/2007 | ............ G06F 3/147 |
| KR | 10-2015-0101366 A | 9/2015 | |
| KR | 10-2015-0118306 A | 10/2015 | |
| KR | 10-2018-0042725 A | 4/2018 | |
| KR | 10-1950497 B1 | 2/2019 | |
| KR | 1950497 B1 * | 2/2019 | ............. G11B 27/02 |
| WO | 2011/091296 A1 | 7/2011 | |

OTHER PUBLICATIONS

Written Opinion (PCT/ISA/237) issued Nov. 11, 2021 by the International Searching Authority for International Patent Application No. PCT/KR2021/009822.
Communication issued Oct. 30, 2023 by the European Patent Office in European Patent Application No. 21848707.2.
Communication dated Aug. 20, 2024, issued by the Korean Intellectual Property Office in Korean Patent Application No. 10-2020-0096312.

* cited by examiner

IMAGE OUTPUT METHOD AND ELECTRONIC DEVICE SUPPORTING SAME

CROSS-REFERENCE TO RELATED APPLICATIONS

This application is a by-pass continuation application of International Application No. PCT/KR2021/009822, filed on Jul. 28, 2021, which based on and claims priority to Korean Patent Application No. 10-2020-0096312, filed on Jul. 31, 2020, in the Korean Intellectual Property Office, the disclosures of which are incorporated by reference herein in their entireties.

BACKGROUND

1. Field

The disclosure relates to a method for outputting an image and an electronic device supporting the same.

2. Description of Related Art

An electronic device, such as a smartphone or a tablet PC, may play a video. When one video is stored, the stored video may be used by various applications. For example, the electronic device may capture a video using a camera application (or app). The captured video may be played by using an image playback application or may be played together with an edit function by using a video edit application.

When an electronic device switches playback to another second application while one video is played by using a first application, the video may be played from the beginning irrespective of each other or may be played at a separate playback time point according to a history where it is previously executed by using the second application. Alternatively, when the electronic device supports continue watching between the first application and the second application, because a screen connection is not natural and screen switching takes a long time, a black screen or a loading screen may be output.

SUMMARY

Provided is an electronic device for facilitating smooth playback switching, when switching between applications for video playback.

According to an aspect of the disclosure, an electronic device includes: a display; and a processor configured to: play a video on the display by using a first application, obtain playback information associated with playing the video by using the first application, activate a second application while the video is played by using the first application, determine a frame of the video corresponding to a time point at which the second application is activated, and seek the frame to play the video by using the second application, based on the second application being able to seek the frame within a reference time.

The processor may be further configured to seek a sync frame adjacent to the frame in the video to play the video by using the second application, based on the second application being unable seek the frame within the reference time.

The processor may be further configured to seek a frame that is processed or a sync frame adjacent to the frame that is processed to start playback, based on the reference time elapsing in a process of seeking the frame by using the second application.

The processor may be further configured to operate the first application in a background state or end the first application, based on the second application operating in a foreground state.

The processor may be further configured to update the playback information by using the second application, and provide the updated playback information to the first application.

The processor may be further configured to play the video based on the updated playback information by using the first application.

The processor may be further configured to output a capture image for the frame on the display by using the first application, based on the second application being launched.

The playback information may include the capture image, and the capture image may be output on the display, based on the second application operating in the foreground.

The processor may be further configured to determine whether the second application is able to seek the frame within the reference time based on image information of the video and performance of a codec of the electronic device.

The processor may be further configured to determine whether the second application is able to seek the frame based on a comparison of the reference time and a seek processing time Tf calculated based on an Equation as follows: $Tf=(Wv*Hv*Fv*Sfrm\_interval)/(Wc*Hc*Fc)$, where Wv*Hv is a resolution of the video, Wv is a horizontal width, Hv is a vertical width, Fv is a frame per second (fps) of the video, Sfrm_interval is an interval of a sync frame, Wc*Hc is a resolution capable of being processed by the codec (Wc: the horizontal width, Hc: the vertical width, and Fc is a frame per second (fps) capable of being processed by the codec.

The processor may be further configured to activate the second application based on a user input generated in the first application.

The processor may be further configured to: activate the first application on a first area of the display, activate the second application on a second area of the display, update the playback information by using the second application, and provide the updated playback information to the first application.

The processor may be further configured to provide the playback information to a management module configured to access the first application or the second application.

The playback information may include at least one of a portion of image information, a capture image of the frame, playback time information, screen setting information, playback scheme information, subtitle setting information, or audio information.

According to an aspect of the disclosure, a method performed in an electronic device, includes: playing a video by using a first application; obtaining playback information associated with the playing the video by using the first application; activating a second application while the video is played by using the first application; determining a frame of the video corresponding to a time point where the second application is activated; and seeking the frame to play the video by using the second application, based on the second application being able to seek the frame within a reference time.

The method may further include seeking a sync frame adjacent to the frame in the video to play the video by using the second application, based on the second application being unable seek the frame within the reference time.

The method may further include seeking a frame that is processed or a sync frame adjacent to the frame that is processed to start playback, based on the reference time elapsing in a process of seeking the frame by using the second application.

The method may further include operating the first application in a background state or ending the first application, based on the second application operating in a foreground state.

The method may further include: updating the playback information by using the second application, and providing the updated playback information to the first application.

The method may further include playing the video based on the updated playback information by using the first application The electronic device according to one or more embodiments of the disclosure may provide continuous playing of a video, when switching an application while playing the video. The electronic device according to one or more embodiments of the disclosure may provide smooth screen switching when switching between applications using a capture image of a video that is played.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar denotations may be used for the same or similar components.

DETAILED DESCRIPTION

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar denotations may be used for similar components.

Figure 1:
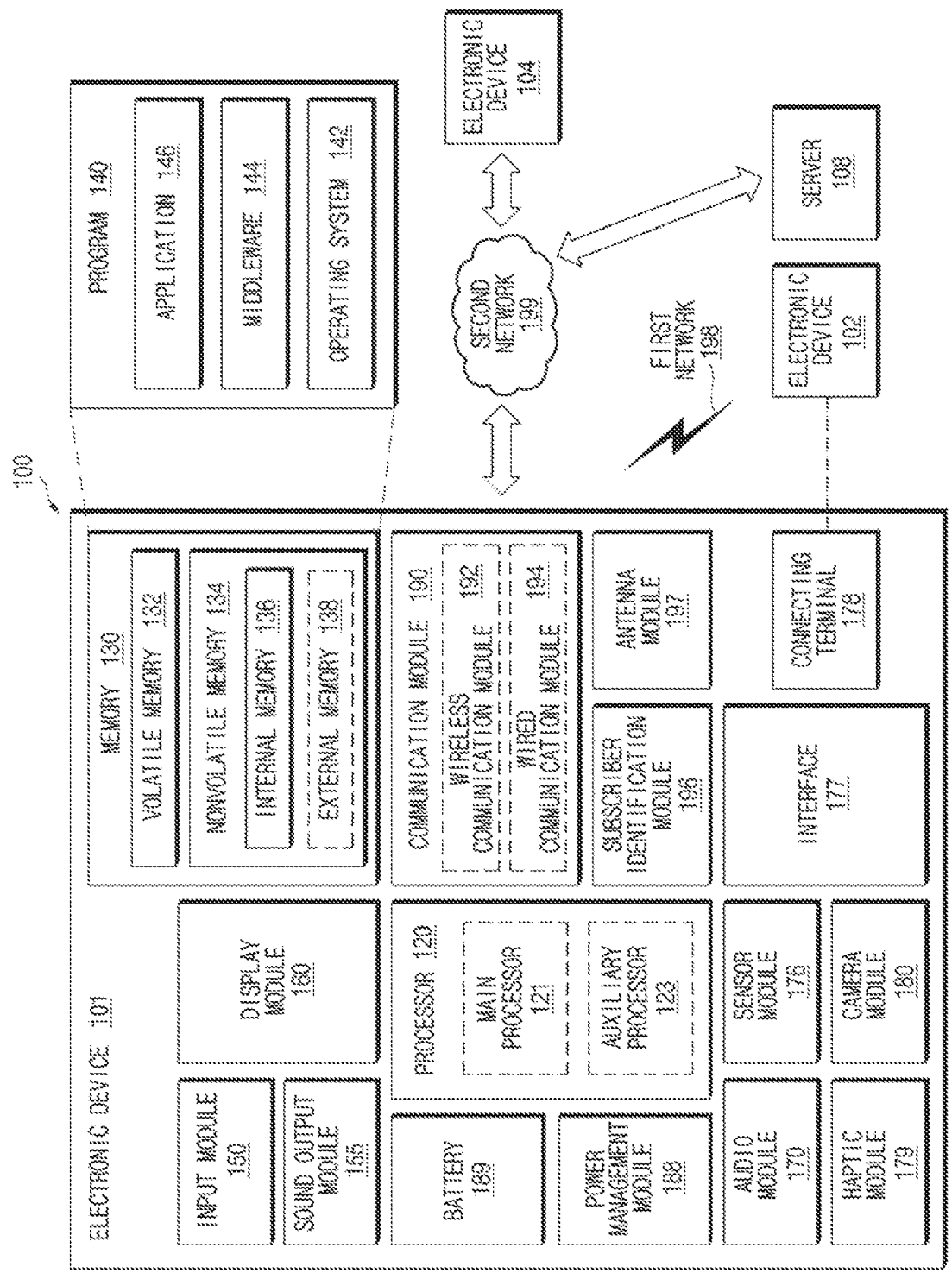
FIG. 1 is a block diagram illustrating an electronic device in a network environment according to one or more embodiments.

FIG. 1 is a block diagram illustrating an electronic device 101 in a network environment 100 according to various embodiments. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

The electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
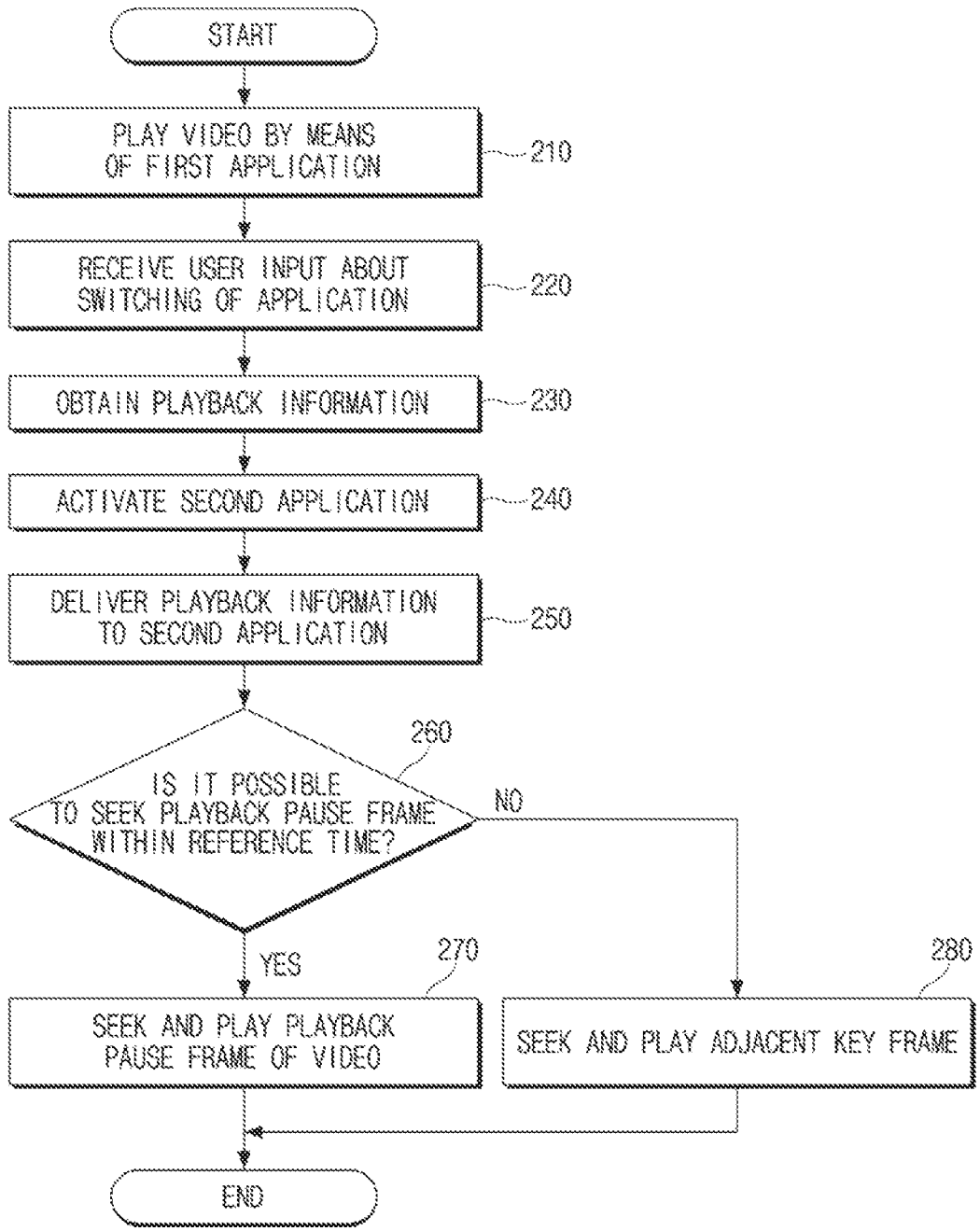
FIG. 2 illustrates an image output method according to one or more embodiments.

FIG. 2 illustrates an image output method according to one or more embodiments.

Referring to FIG. 2, according an embodiment, in operation 210, a processor 120 may play a video by using a first application (e.g., an image playback application). For example, the video may be an image captured by a camera module 180 in an electronic device 101. For another example, the video may be an image downloaded from an external device or a server.

According an embodiment, in operation 220, a processor 120 may receive a user input about switching of an application. The user input may be an input generated on a user interface (UI) of the first application. For example, the user input may be an input touching a video edit button among icons included in the image playback application, while the video is played by using the image playback application.

In an embodiment, the processor 120 may pause the video that is being played by using the first application, based on the user input. For example, when receiving a user input for running a second application, the processor 120 may pause the playback of the video at a specific frame (or a specific time point) of the video that is being played (or being output).

Hereinafter, the specific frame displayed on the screen at the (specific) time point when the playback of the video is paused may be referred to as a 'playback pause frame'. The playback pause frame is not limited thereto. The playback pause frame may be a frame having the fastest playback order or a frame faster or slower than a specified time (e.g., 0.1 second) or a specified frame (e.g., 1 frame) at the time point when the playback is paused, among frames stored in a buffer memory (e.g., a memory 130 of FIG. 1) for display at the time point when the playback is paused.

According an embodiment, in operation 230, the processor 120 may obtain information associated with playback of the video that is being played (hereinafter, playback information). The playback information may include at least one of image information, a capture image, playback time information, screen setting information, playback scheme information, subtitle setting information, or audio information (refer to FIG. 6). According to an embodiment, at least one of the playback information may be collected before operation 220.

According an embodiment, in operation 240, the processor 120 may activate the second application in response to the user input. The second application may be different from the first application. The operation of activating the second application may be an operation of running the second application or switching (or preparing for switching) to foreground running of the second application running in the background. For example, the second application may be a video edit application.

According an embodiment, in operation 250, the processor 120 may deliver playback information to the second application. The delivered playback information may include at least one of the playback information obtained in operation 230. The playback information may be directly delivered from the first application to the second application. Alternatively, the playback information may be delivered through a separate medium module (or a middle management module, such as a playback information management module 430 in FIG. 4).

According an embodiment, in operation 260, the processor 120 may identify whether it is possible for the second application to seek and play the playback pause frame within a specified reference time.

According to an embodiment, the processor 120 may calculate a time necessary to seek the playback pause frame of the video (hereinafter, a seek processing time), based on image information (e.g., resolution, a codec, a sync frame interval, or a file format) of the video that is played and codec performance (e.g., hardware codec performance). For example, the processor 120 may compare the seek processing time Tf calculated by Equation 1 below with a reference time N.

$$Tf=(Wv*Hv*Fv*\text{Sfrm\_interval})/(Wc*Hc*Fc), \quad \text{[Equation 1]}$$

where Tf is the seek processing time,
Wv*Hv is the resolution of the video (Wv: the horizontal width, Hv: the vertical width),
Fv is the frame per second (fps) of the video,
Sfrm_interval is the interval of the sync frame,
Wc*Hc is the resolution capable of being processed by the codec (Wc: the horizontal width, Hc: the vertical width), and
Fc: the frame per second (fps) capable of being processed by the codec.

According to one or more embodiments, when the fps information of the video is stored in a header of a video file, the processor 120 may use the stored fps information. For content in which there is no fps information of the video in the header of the video file, the processor 120 may calculate fps information of the video using time stamp values during playback.

According to one or more embodiments, when there is a table about the interval "Sfrm_interval" of the sync frame in the video file, the processor 120 may use the corresponding table. The sync frame (or a key frame) may be inserted per specified playback length of the video for a fast seek operation.

According an embodiment, when it is possible to seek the playback pause frame within the specified reference time (operation 260—YES), in operation 270, the processor 120 may seek the playback pause frame of the video to play the video by using the second application. For example, when the seek processing time Tf is less than or equal to the reference time N, the processor 120 may determine that it is possible to seek the playback pause frame within the specified reference time and may seek the playback pause frame to play the video by using the second application.

According to one or more embodiments, when the time taken to seek the playback pause frame is longer than the reference time N, the processor 120 may start playback from a location sought up to the reference time N.

When the seek processing time Tf is greater than the reference time N (operation 260—NO), in operation 280, the processor 120 may seek the key frame (or the sync frame) adjacent to the playback pause frame to play the video.

Figure 3:
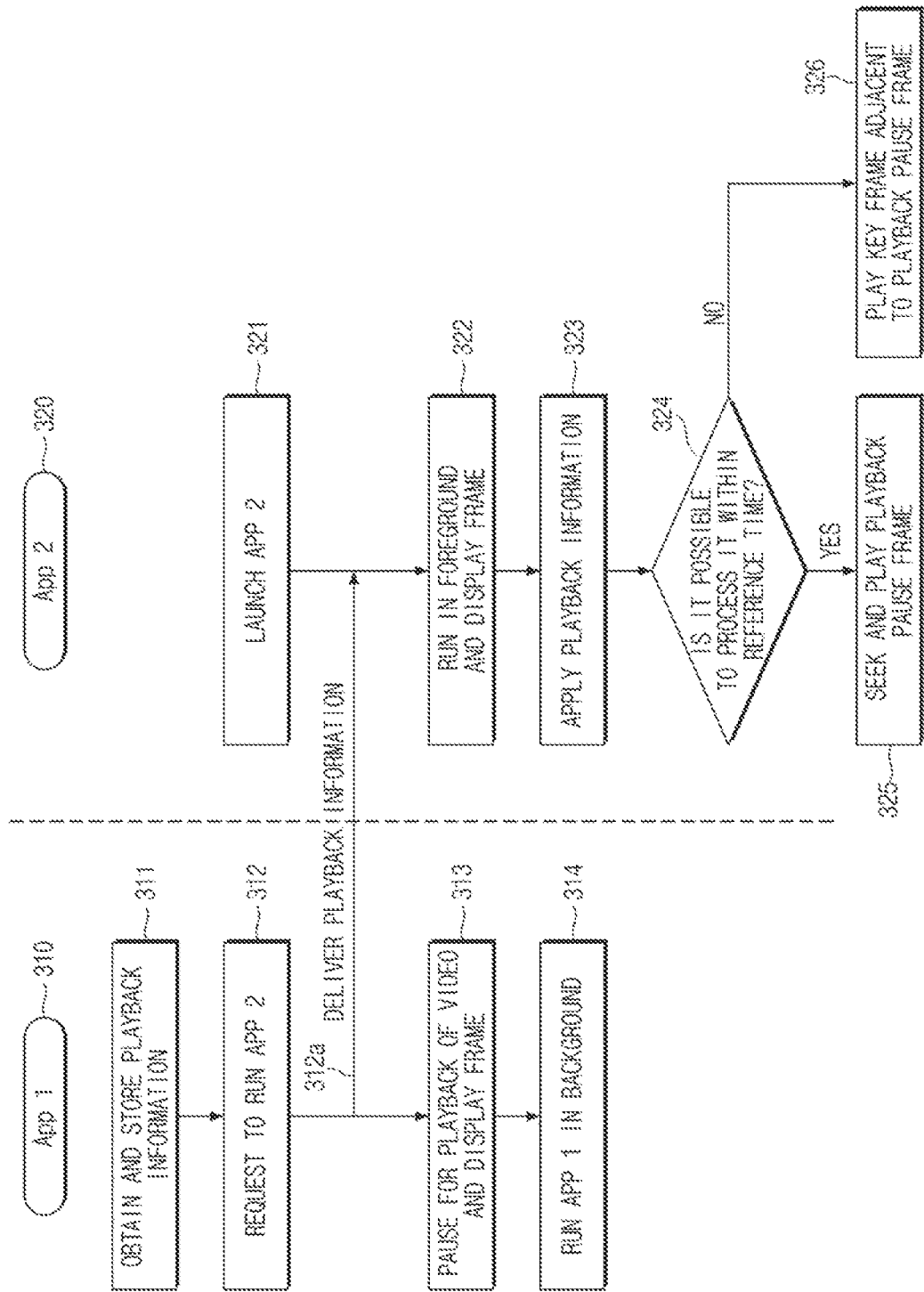
FIG. 3 illustrates switching of an application while a video is played according to one or more embodiments.

FIG. 3 illustrates switching of an application while a video is played according to one or more embodiments.

Referring to FIG. 3, according an embodiment, while an electronic device (e.g., an electronic device 101 of FIG. 1) plays a video by using a first application App 1 310, as the playback is paused by the first application 310, the video may be subsequently played by using a second application App 2 320. According to one or more embodiments, operations 311 to 326 may be understood as operations of a processor (e.g., the processor 120 of FIG. 1) that runs the first application and the second application.

According to an embodiment, the first application 310 may play a video. For example, the first application 310 may play a video depending on a user input or a call of another application.

In operation 311, the first application 310 may obtain and store playback information of the video. The playback information may include at least one of image information, a capture image, playback time information, screen setting information, playback scheme information, subtitle setting information, or audio information.

According to an embodiment, the playback information may be updated in real time in the process of playing the video. For example, the playback time information (or frame information of played video) may be updated in real time while the playback is in progress. According to an embodiment, the playback time information and the capture image may be continuously updated in operation 312.

According to another embodiment, the playback information may be updated when changed in a default setting. For example, the screen setting information and the subtitle information may be updated, when their values are changed by a user input.

According to an embodiment, in operation 312, the first application 310 may request to run the second application 320. For example, when a user input is generated on a button for running the second application 320, which is included in a UI of the first application 310. The first application 310 may request to run the second application 320.

According to an embodiment, in operation 321, the second application 320 may be launched or run. The second application 320 may be an application that plays a video and operates independently of the first application 310.

According to an embodiment, in operation 312a, the first application 310 may deliver the obtained playback information to the second application 320. For example, the first application 310 may deliver at least one of the playback information obtained in operation 311 to the second application 320.

According to an embodiment, when the second application 320 is launched, in operation 313, the first application 310 may pause the playback of the video and may display a capture image (or a frame) of the video that is being played.

According to an embodiment, in operation 322, the second application 320 may switch to run in the foreground and may display the capture image (or the frame) of the video. The capture image may be a portion of the playback information to be delivered to the second application 320 and may be adjusted in size or location according to the UI of the second application 320.

According to an embodiment, in operation 314, the first application 310 may switch to run in the background or the running of the application 310 may be ended, in response to the switching of the second application 320 to the running in the foreground.

According to an embodiment, in operation 323, the second application 320 may apply or use the received playback information. The second application 320 may fail to apply information associated with a function that is not supported. The second application 320 may prepare for continuous playback of the video.

According to an embodiment, in operation 324, the second application 320 may determine whether it is possible for the second application 320 to seek the playback pause frame of the video within a specified reference time (e.g., about 1 second).

For example, the reference time may be determined as a time when a black screen or a loading icon upon the switching of the application is not output.

According to an embodiment, the second application 320 may determine whether it is possible to seek the playback pause frame within the reference time based on the seek processing time calculated based on image information (e.g., resolution, a codec, a sync frame interval, or a file format) of the video that is being played and codec performance (e.g., hardware codec performance).

When it is possible to seek the playback pause frame within the reference time (operation 324—YES), in operation 325, the second application 320 may seek and play the playback pause frame.

According to an embodiment, when the reference time is exceeded while the second application 320 seeks (decodes) the playback pause frame, the second application 320 may start playback from a frame decoded up to the reference time or may seek a close key frame to start playback.

When it is determined that it is not possible to seek the playback pause frame within the specified time (operation 324—NO), in operation 326, the second application 320 may seek a key frame (or a sync frame) adjacent to the playback pause frame to start playback.

Figure 4:
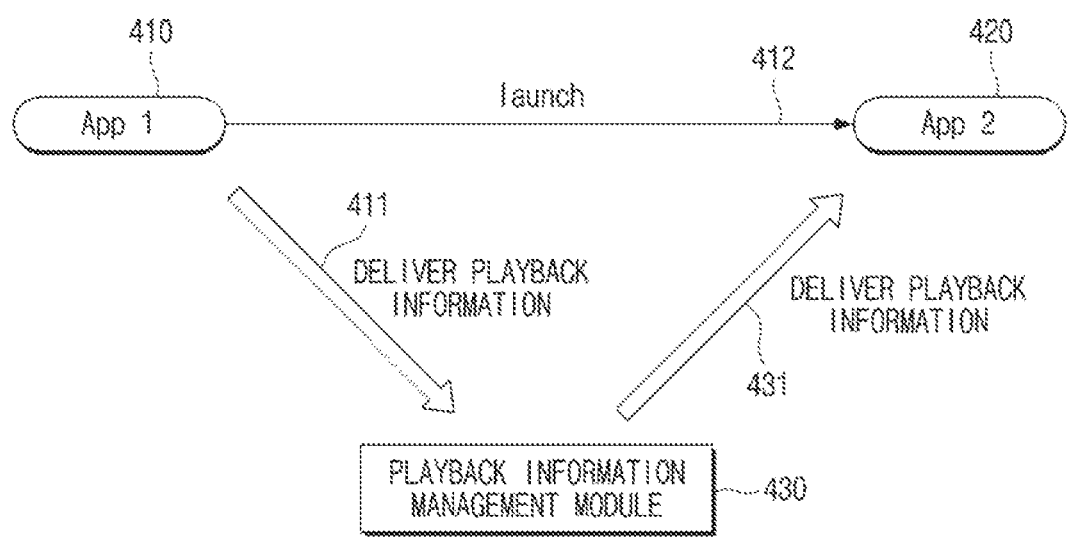
FIG. 4 illustrates management of playback information by using a separate manager according to one or more embodiments.

FIG. 4 illustrates management of playback information by a separate manager according to one or more embodiments.

Referring to FIG. 4, a first application App 1 410, according to an embodiment, may play a video. The first application App 1 410 may extract and transmit playback information of the video to a playback information management module 430 (411). The playback information may be transmitted to the playback information management module 430 in real time during a process of playing the video.

According to an embodiment, the first application App 1 410 may request to run a second application App 2 420 (412). For example, when a user input is generated on a button for running the second application 420, which is included in a UI of the first application 410, the first application App 1 410 may request to run the second application App 2 420.

According to an embodiment, the playback information management module 430 may store and manage playback information received from the first application 410 in a memory (e.g., the memory 130 of FIG. 1). When the second application 420 is launched, the playback information management module 430 may deliver the stored playback information to the second application 420 (operation 431). According to an embodiment, the playback information management module 430 may transmit some data applicable to the second application 420 in the playback information.

According to an embodiment, the playback information management module 430 may be stored as a program (e.g., the program 140 of FIG. 1) in the memory 130 and may be executed by a processor (e.g., the processor 120 of FIG. 1). In an embodiment, the first application App 1 410 and the second application App 2 420 may be included in an application layer (e.g., the application 146 of FIG. 1), and the playback information management module 430 may be included in a middleware layer (e.g., a middleware 144 of FIG. 1).

According to one or more embodiments, the playback information management module 430 may change and deliver the playback information to a format applicable to the second application 420 to the second application 420. For example, the playback information management module 430 may resize and deliver a capture image to correspond to a UI of the second application 420.

According to an embodiment, the second application 420 may play a video that is played by using the first application 410 based on the playback information management module 430. When it is possible to seek a playback pause frame within a specified reference time, the second application 420 may start playback from the playback pause frame.

Figure 5:
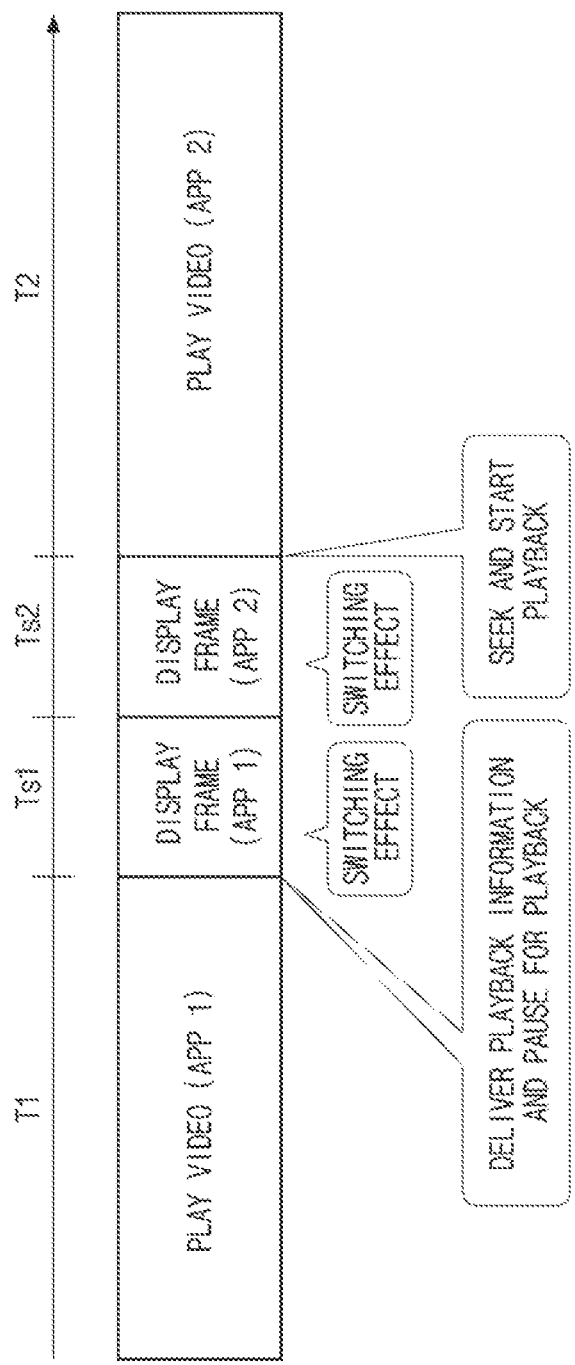
FIG. 5 is a time flowchart of switching of an application while a video is played according to one or more embodiments.

FIG. 5 is a time flowchart of switching of an application while a video is played according to one or more embodiments.

Referring to FIG. 5, in a process of playing one video, a first application App 1 and a second application App 2 may switch with each other to be run.

According to an embodiment, in a first playback interval T1, the first application App 1 may play a video. The first application App 1 may extract playback information in the playback process.

According to an embodiment, the second application App 2 may be launched and may prepare for playback, between the first playback interval T1 and a first switching interval Ts1. The first application App 1 may deliver the extracted playback information to the second application App 2.

According to an embodiment, in the first switching interval Ts1, the first application App 1 may pause the playback of the video and may display a capture image (or a frame).

According to an embodiment, in a second switching interval Ts2, the second application App 2 may switch to running in the foreground, and the first application App 1 may switch to running in the background. The second application App 2 may display the capture image included in the playback information (display a frame). The capture image may be included in a portion of the playback information and may be changed in size, magnitude, or location according to a characteristic of a UI of the second application App 2.

According to an embodiment, in the second switching interval Ts2 and a second playback interval T2, the second application App 2 may seek a playback pause frame to play the video. When it is not possible to seek the playback pause frame within a specified reference time, the second application App 2 may seek a key frame (a sync frame) adjacent to the playback pause frame to play the video.

According to an embodiment, in the second playback interval T2, the second application App 2 may play the video. The second application App 2 may start playback from the playback pause frame.

According to an embodiment, the second application App 2 may extract playback information in the playback process. Thereafter, when switching to the first application App 1 or another application, the second application App 2 may provide the extracted playback information to the running application.

Figure 6:
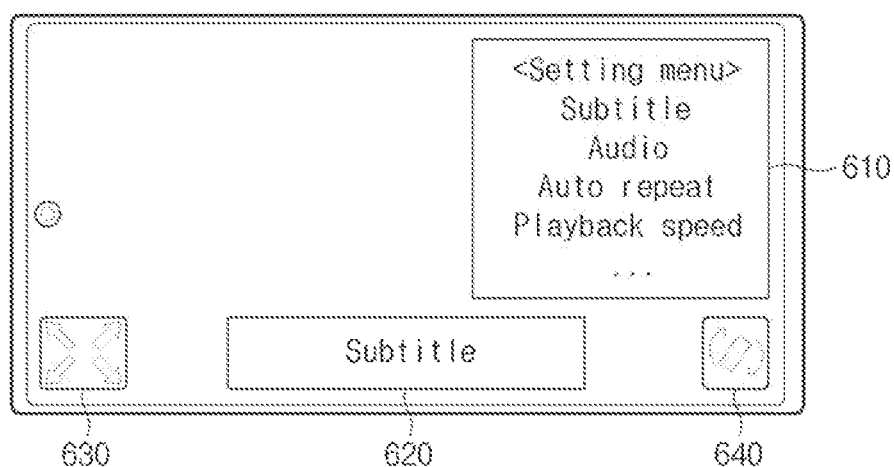
FIG. 6 illustrates playback information according to one or more embodiments.

FIG. 6 illustrates playback information according to one or more embodiments. FIG. 6 is illustrative, but not limited thereto.

Referring to FIG. 6, the playback information may include various pieces of information associated with playback of a video. For example, the playback information may include information set or changed in conjunction with the playback of the video, on a pop-up window 610 displayed when a setting button is pressed during the playback of the video.

According to an embodiment, the playback information may include at least one of image information, a capture image, playback time information, screen setting information, playback scheme information, subtitle setting information, or audio information.

According to an embodiment, the image information may be, for example, resolution information, key frame information, or frame information, playback that is paused. The capture image may be an image currently played in a screen. For example, the playback time information may be information indicating that a frame of 16 minutes and 41.56 seconds is played in a total of 60 minutes of video.

According to an embodiment, the subtitle setting information may include at least one of information about a location, a color, or a font of a subtitle 620. The audio information may include at least one of, for example, equalizer information, audio track information, or sync information.

According to an embodiment, the screen setting information may include at least one of, for example, screen-customized information 630 (e.g., a full screen, ratio maintenance, fitting to a specific region, or cutting setting), a screen direction 640 (rotation information), or an aspect ratio. The playback scheme information may include, for example, information about auto repeat, playback speed, etc.

Figure 7:
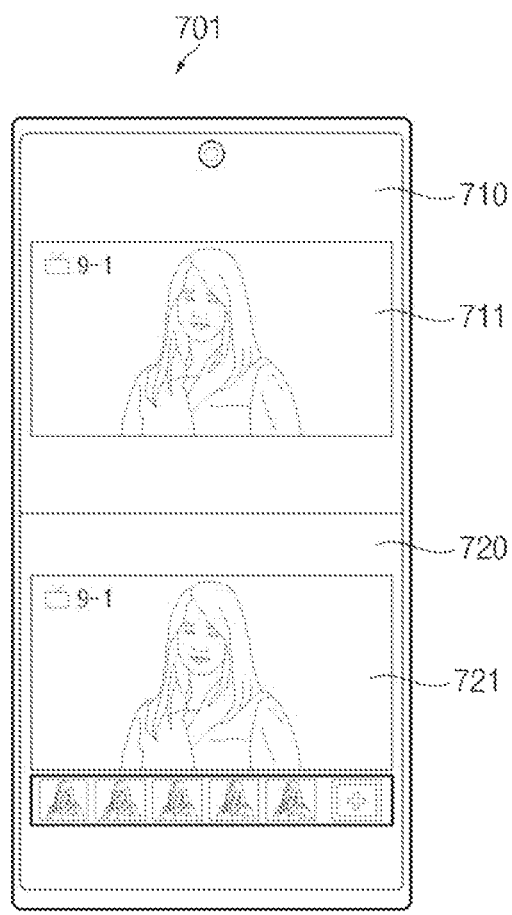
FIG. 7 illustrate continuous playback of a video on a multi-window according to one or more embodiments.

FIG. 7 illustrate continuous playback of a video on a multi-window according to one or more embodiments.

Referring to FIG. 7, an electronic device 701 according to an embodiment may operate in a multi-window scheme. For example, the electronic device 701 may run a first application 711 in a first area 710 and may run a second application 721 in a second area 720. For example, the first application 711 may be an image playback application, and the second application 721 may be a video edit application.

According to an embodiment, the electronic device 701 may play a video in the first area 710 by using the first application 711. The electronic device 701 may extract and store playback information of the video by using the first application 711. When the second application 721 is run, the electronic device 701 may provide the second application 721 with the playback information extracted by using the first application 711.

According to an embodiment, the electronic device 701 may play a video by using the second application 721, using the playback information.

According to an embodiment, the electronic device 701 may calculate a seek processing time calculated based on image information (e.g., resolution, a codec, a sync frame interval, or a file format) of the video that is played and codec information (e.g., hardware codec performance) and may seek a playback pause frame based on comparing the seek processing time with a reference time.

According to one or more embodiments, the electronic device 701 may play one video by using the first application 711 in the first area 710 on a screen and the second application 721 in the second area 720 on the screen at the same time. When the second application 721 becomes a state where it is able to start playback from the playback pause frame, the first application 711 and the second application 721 may start playback together in the form of being synchronized.

FIG. 7 illustrates that it is played on two multi-windows on one display, but not limited thereto. For example, the electronic device 701 may be a multi-display device or a foldable device, which has a plurality of display surfaces. In this case, the electronic device 701 may run different applications on the respective display surfaces to play the same video. The electronic device 701 may allow syncs of screens played on the respective display surfaces to be identical to each other.

FIG. 7 illustrates the simultaneous playback of the video by using the first application 711 in the first area 710 and the second application 721 in the second area 720, but not limited thereto. For example, when the playback of the video by using the second application 721 is started, the playback of the video by using the first application 711 may be paused or the first application 711 may switch to running in the background or may be ended.

Figure 8:
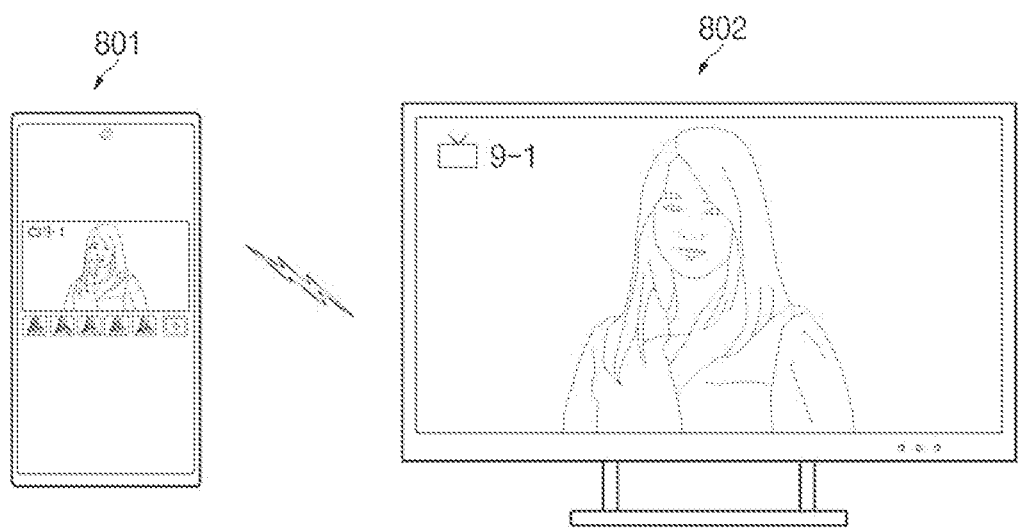
FIG. 8 illustrates that a plurality of devices play one video according to one or more embodiments.

FIG. 8 illustrates that a plurality of devices play one video according to one or more embodiments.

Referring to FIG. 8, a first electronic device 801 may play a video by using a first application (e.g., a video edit application). The electronic device 801 may extract and store playback information of the video by using the first application. The first electronic device 801 may provide a second electronic device 802 with the playback information extracted by using the first application.

According to an embodiment, the second electronic device 802 may play the video by using a second application (e.g., an image playback app), using the playback information. According to an embodiment, the second electronic device 802 may calculate a seek processing time calculated based on image information (e.g., resolution, a codec, a sync frame interval, or a file format) of the video that is played and codec information (e.g., hardware codec performance) and may seek a playback pause frame based on comparing the seek processing time with a reference time.

According to an embodiment, the first electronic device 801 and the second electronic device 802 may play the video having the same file structure at the same time in the form of being synchronized with each other.

According to an embodiment, different playback effects may be applied to the first electronic device 801 and the database server 802. For example, the second device 802 may add and play a special viewing effect (e.g., an object tracking player).

According to one or more embodiments, the second electronic device 802 may store at least one of a file played by the first electronic device 801 in advance. The second electronic device 802 may receive server information (e.g., a Uniform Resource Locator (URL)) capable of receiving a played file from the first electronic device 801 or downloading the file. In this case, when calculating the seek processing time, the second electronic device 802 may additionally reflect a communication delay (a network delay).

FIG. 8 illustrates that the second electronic device 802 is a TV or a monitor in FIG. 8, but not limited thereto. The second electronic device 802 may be various devices such as a mobile terminal, a PC/mobile PC, and a smart watch.

According to one or more embodiments, an electronic device (e.g., the electronic device 101 of FIG. 1) may include a display (e.g., the display device 160 of FIG. 1), a memory (e.g., the memory 130 of FIG. 1), and a processor (e.g., the processor 120 of FIG. 1). The processor (e.g., the processor 120 of FIG. 1) may play a video by using a first application, may obtain playback information associated with playing the video by using the first application, may activate a second application while the video is played, may determine a frame of the video, corresponding to a time point when the second application is activated, by using the first application, and may seek the frame to play the video by using the second application, when it is possible for the second application to seek the frame within a specified reference time.

According to one or more embodiments, the processor (e.g., the processor 120 of FIG. 1) may seek a sync frame adjacent to the frame in the video to play the video by using the second application, when it is not possible to seek the frame within the reference time.

According to one or more embodiments, the processor (e.g., the processor 120 of FIG. 1) may seek a frame that is processed or a sync frame adjacent to the frame that is processed, when the reference time elapses in a process of seeking the frame by using the second application.

According to one or more embodiments, the processor (e.g., the processor 120 of FIG. 1) may operate the first application in a background state or may end the first application, when the second application operates in a foreground state.

According to one or more embodiments, the processor (e.g., the processor 120 of FIG. 1) may update the playback information by using the second application and may deliver the updated playback information to the first application.

According to one or more embodiments, the processor (e.g., the processor 120 of FIG. 1) may play the video based on the updated playback information by using the first application.

According to one or more embodiments, the processor (e.g., the processor 120 of FIG. 1) may output a capture image for the frame on the display (e.g., the display device 160 of FIG. 1) by using the first application, when the second application is launched.

According to one or more embodiments, the playback information may include the capture image. The capture image is output on the display (e.g., the display device 160 of FIG. 1), when the second application operates in the foreground.

According to one or more embodiments, the processor (e.g., the processor 120 of FIG. 1) may determine whether it is possible to seek the frame within the reference time based on image information of the video and performance of a codec of the electronic device (e.g., the electronic device 101 of FIG. 1).

According to one or more embodiments, the processor (e.g., the processor 120 of FIG. 1) may compare a seek processing time calculated based on Equation below with the reference time to determine whether it is possible to seek the frame.

$$Tf = (Wv*Hv*Fv*\text{Sfrm\_interval})/(Wc*Hc*Fc) \quad \text{[Equation]}$$

Tf: the seek processing time
Wv*Hv: the resolution of the video (Wv: the horizontal width, Hv: the vertical width)
Fv: the frame per second (fps) of the video
Sfrm_interval: the interval of the sync frame
Wc*Hc: the resolution capable of being processed by the codec (Wc: the horizontal width, Hc: the vertical width)
Fc: the frame per second (fps) capable of being processed by the codec.

According to one or more embodiments, the processor (e.g., the processor 120 of FIG. 1) may activate the second application in response to a user input generated in the first application.

According to one or more embodiments, the processor (e.g., the processor 120 of FIG. 1) may activate the first application in a first area of the display (e.g., the display device 160 of FIG. 1) and may activate the second application in a second area of the display (e.g., the display device 160 of FIG. 1).

According to one or more embodiments, the processor (e.g., the processor 120 of FIG. 1) may update the playback information by using the second application and may deliver the updated playback information to the first application.

According to one or more embodiments, the processor (e.g., the processor 120 of FIG. 1) may play the video in the first area of the display (e.g., the display device 160 of FIG. 1) by using the first application, may play the video in the second area of the display (e.g., the display device 160 of FIG. 1) by using the second application, and may synchronize the first application with the second application based on the updated playback information.

According to one or more embodiments, the processor (e.g., the processor 120 of FIG. 1) may deliver the playback information to a management module capable of accessing the first application or the second application.

According to one or more embodiments, the first application may be an image playback app, and the second application may be a video edit app.

According to an embodiment, the playback information may include at least one of image information, a capture image of the frame, playback time information, screen setting information, playback scheme information, subtitle setting information, or audio information.

According to one or more embodiments, an image output method performed in an electronic device (e.g., an electronic device 101 of FIG. 1) may include playing a video by using a first application, obtaining playback information associated with playing the video by using the first application, activating a second application while the video is played, determining a frame of the video, corresponding to a time point where the second application is activated, by using the first application, and seeking the frame to play the video by using the second application, when it is possible for the second application to seek the frame within a specified reference time.

According to one or more embodiments, the method may further include seeking a sync frame adjacent to the frame in the video to play the video by using the second application, when it is not possible to seek the frame within the reference time.

According to one or more embodiments, the playing of the video may include seeking a frame that is processed or a sync frame adjacent to the frame that is processed to start playback, when the reference time elapses in a process of seeking the frame by using the second application.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display; and
   a processor configured to:
      play a video on the display by using a first application,
      obtain playback information associated with playing the video by using the first application,
      activate a second application while the video is played by using the first application,
      determine a frame of the video corresponding to a time point at which the second application is activated,
      based on the second application being able to seek the frame within a reference time, seek the frame by using the second application and play the video from the frame, and
      based on the second application being unable to seek the frame within the reference time, seek a sync frame adjacent to the frame by using the second application and play the video from the sync frame.

2. The electronic device of claim 1, wherein the processor is further configured to seek another frame that is processed or another sync frame adjacent to the another frame that is processed to start playback, based on the reference time elapsing in a process of seeking the frame by using the second application.

3. The electronic device of claim 1, wherein the processor is further configured to operate the first application in a background state or end the first application, based on the second application operating in a foreground state.

4. The electronic device of claim 1, wherein the processor is further configured to:
   update the playback information by using the second application, and
   provide the updated playback information to the first application.

5. The electronic device of claim 4, wherein the processor is further configured to play the video based on the updated playback information by using the first application.

6. The electronic device of claim 1, wherein the processor is further configured to output a capture image for the frame on the display by using the first application, based on the second application being launched.

7. The electronic device of claim 6, wherein the playback information comprises the capture image, and wherein the capture image is output on the display, based on the second application operating in the foreground.

8. The electronic device of claim 1, wherein the processor is further configured to determine whether the second application is able to seek the frame within the reference time based on image information of the video and performance of a codec of the electronic device.

9. The electronic device of claim 8, wherein the processor is further configured to determine whether the second application is able to seek the frame based on a comparison of the reference time and a seek processing time Tf calculated based on an Equation as follows:

$$Tf=(Wv*Hv*Fv*\text{Sfrm\_interval})/(Wc*Hc*Fc),$$

where Wv*Hv is a resolution of the video, Wv is a horizontal width, Hv is a vertical width, Fv is a frame per second (fps) of the video, Sfrm_interval is an interval of a sync frame, Wc*Hc is a resolution capable of being processed by the codec (Wc: the horizontal width, Hc: the vertical width, and Fc is a frame per second (fps) capable of being processed by the codec.

10. The electronic device of claim 1, wherein the processor is further configured to activate the second application based on a user input generated in the first application.

11. The electronic device of claim 1, wherein the processor is further configured to:

activate the first application on a first area of the display, activate the second application on a second area of the display, update the playback information by using the second application, and provide the updated playback information to the first application.

12. The electronic device of claim 1, wherein the processor is further configured to provide the playback information to a management module configured to access the first application or the second application.

13. The electronic device of claim 1, wherein the playback information comprises at least one of a portion of image information, a capture image of the frame, playback time information, screen setting information, playback scheme information, subtitle setting information, or audio information.

14. A method performed in an electronic device, the method comprising:

playing a video by using a first application;

obtaining playback information associated with the playing the video by using the first application;

activating a second application while the video is played by using the first application;

determining a frame of the video corresponding to a time point where the second application is activated;

based on the second application being able to seek the frame within a reference time, seeking the frame by using the second application and playing the video from the frame, and based on the second application being unable to seek the frame within the reference time, seeking a sync frame adjacent to the frame by using the second application and playing the video from the sync frame.

15. The method of claim 14, further comprising seeking another frame that is processed or another sync frame adjacent to the another frame that is processed to start playback, based on the reference time elapsing in a process of seeking the frame by using the second application.

16. The method of claim 14, further comprising operating the first application in a background state or ending the first application, based on the second application operating in a foreground state.

17. The method of claim 14, further comprising:

updating the playback information by using the second application, and providing the updated playback information to the first application.

18. The method of claim 17, further comprising playing the video based on the updated playback information by using the first application.

* * * * *